Sept. 26, 1950     R. W. HAUTZENROEDER     2,523,505
HOOD LATCH

Filed July 3, 1948                                     2 Sheets-Sheet 1

INVENTOR.
RICHARD W. HAUTZENROEDER
BY
ATTORNEYS

Sept. 26, 1950  R. W. HAUTZENROEDER  2,523,505
HOOD LATCH

Filed July 3, 1948  2 Sheets-Sheet 2

INVENTOR.
RICHARD W. HAUTZENROEDER
BY
Carlson, Pitzner, Hubbard & Wolfe
ATTORNEYS Patented Sept. 26, 1950

2,523,505

UNITED STATES PATENT OFFICE 2,523,505

HOOD LATCH

Richard W. Hautzenroeder, Mansfield, Ohio, assignor to Harry Ferguson, Inc., Detroit, Mich., a corporation of Delaware Application July 3, 1948, Serial No. 36,960

3 Claims. (Cl. 292—85)

The present invention relates to tractors and more particularly to means for latching a forwardly tipping hood into its upraised position.

It is an object of the present invention to provide an improved latch for holding a tractor hood securely after the same has been raised to an elevated position, so that the hood cannot become accidentally dislodged, as by the wind, and fall on the operator while he is working on or servicing the engine. It is a more detailed object to provide an improved spring detent latch which may be completely hidden and thus not detract from the appearance of the tractor and which is, at the same time, immediately accessible for release by the tractor operator. It is still another object to provide a latch which includes a minimum number of parts, which is simple and inexpensive to construct and install, and which will remain dependable despite hard farm usage.

Other objects and advantages of the invention will be apparent from the following detailed description taken in connection with the accompanying drawings, in which.

Figure 4:
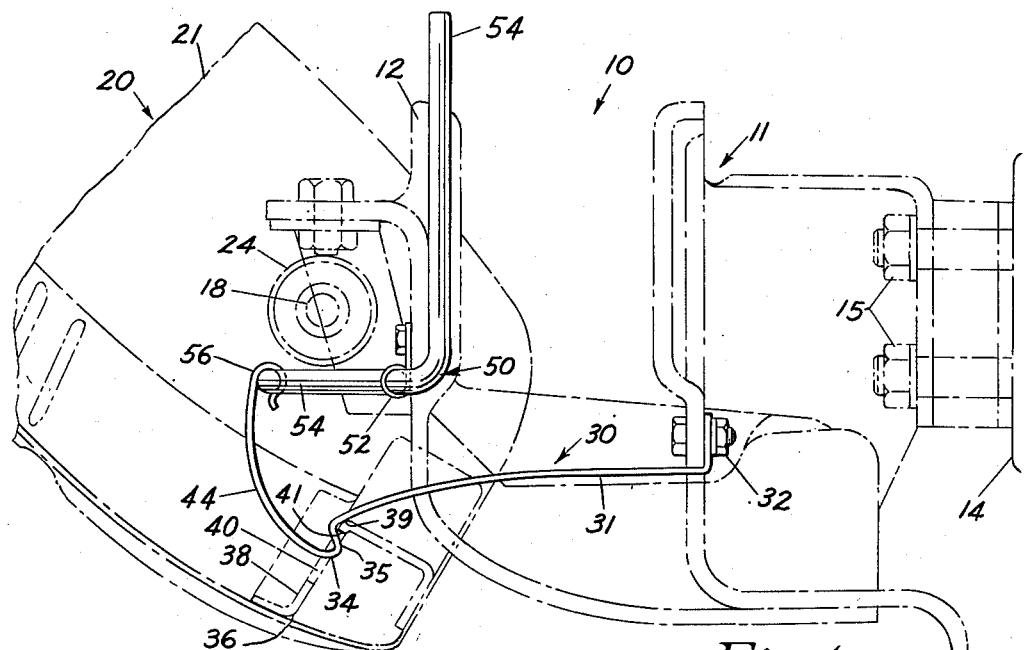
Fig. 4 is a view similar to Fig. 1 but showing the hood tipped forwardly into latched position. As in the other figures of the drawings the parts in addition to the latch are shown fragmentarily and in dot-dash outline.

While the invention is susceptible of various modifications and alternative constructions and uses, I have shown in the drawings and will herein describe in detail one embodiment of the invention. It is to be understood, however, that I do not intend to limit the invention by such disclosure, but aim to cover all modifications and alternative constructions and uses falling within the spirit and scope of the invention as expressed in the appended claims.

Referring now to the drawings, which show a portion of a tractor directly ahead of the engine and above the front wheels, there is disclosed a frame member 10 of well known commercial design. The latter is supported by the tractor front wheels by means not shown and includes an engine supporting bracket 11 and a hood supporting bracket 12. The engine supporting bracket is connected to the engine 14 by means of bolts or the like 15.

Projecting forwardly from the hood supporting bracket 12 as shown in the top view (Fig. 2), are short tabs or arms 16 each of which carries a hood pivot pin 18. The hood indicated at 20 incloses the front end of the tractor and includes rearwardly extending skirts or side walls 21, 22. These side walls are arranged for pivoting on the hood pivot pins 18 so that the hood may be bodily toppled forwardly from the position illustrated in Fig. 1 to that shown in Fig. 4. The connection to the pivot pin 18 may be made by any desired means, for example by small cup-like brackets indicated at 24 and respectively welded to the side walls. It will be understood that the hood 20 is of a conventional type providing an air access grille at its forward surface and extending rearwardly, shielding the engine from above. While an overall assembly view of hood and tractor is not necessary for understanding the present invention, reference may be made to copending application Ser. No. 36,862, filed July 3, 1948, assigned to a common assignee. The latter application covers a hood lock well suited for use with the latch disclosed herein.

In accordance with the present invention an improved spring catch is provided which acts automatically when the hood is rocked into its upraised position to produce secure latching engagement and which may be released merely by applying fingertip pressure to a release lever. In the present instance the latch indicated generally at 30 includes a forwardly extending leaf spring 31 which is cantilever-mounted for vertical swing. Preferably the leaf spring 31 is fastened to the engine supporting bracket 11 by means of a bolt 32. At a point generally under the pivot pins 18 the spring 31 is provided with a downwardly extending hook portion or pawl 34 having an engaging face 35 which is directed rearwardly.

Figure 1:
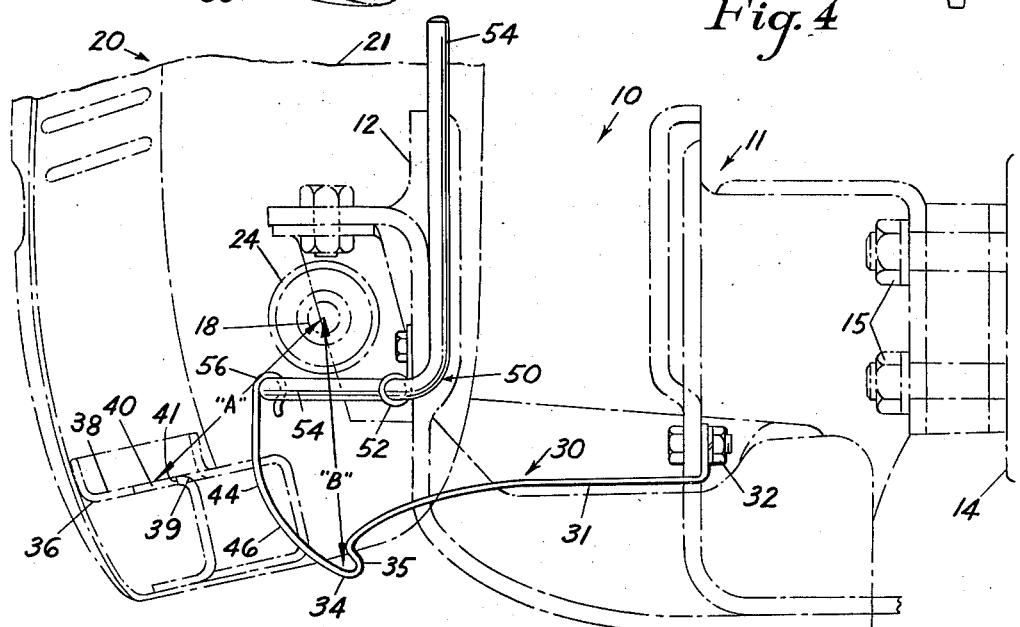
Figure 1 is a side elevation of a latch constructed in accordance with the present invention, the forward portion of the tractor structure and of the front hood being shown merely in dot-dash outline.
Figures 2, 3:
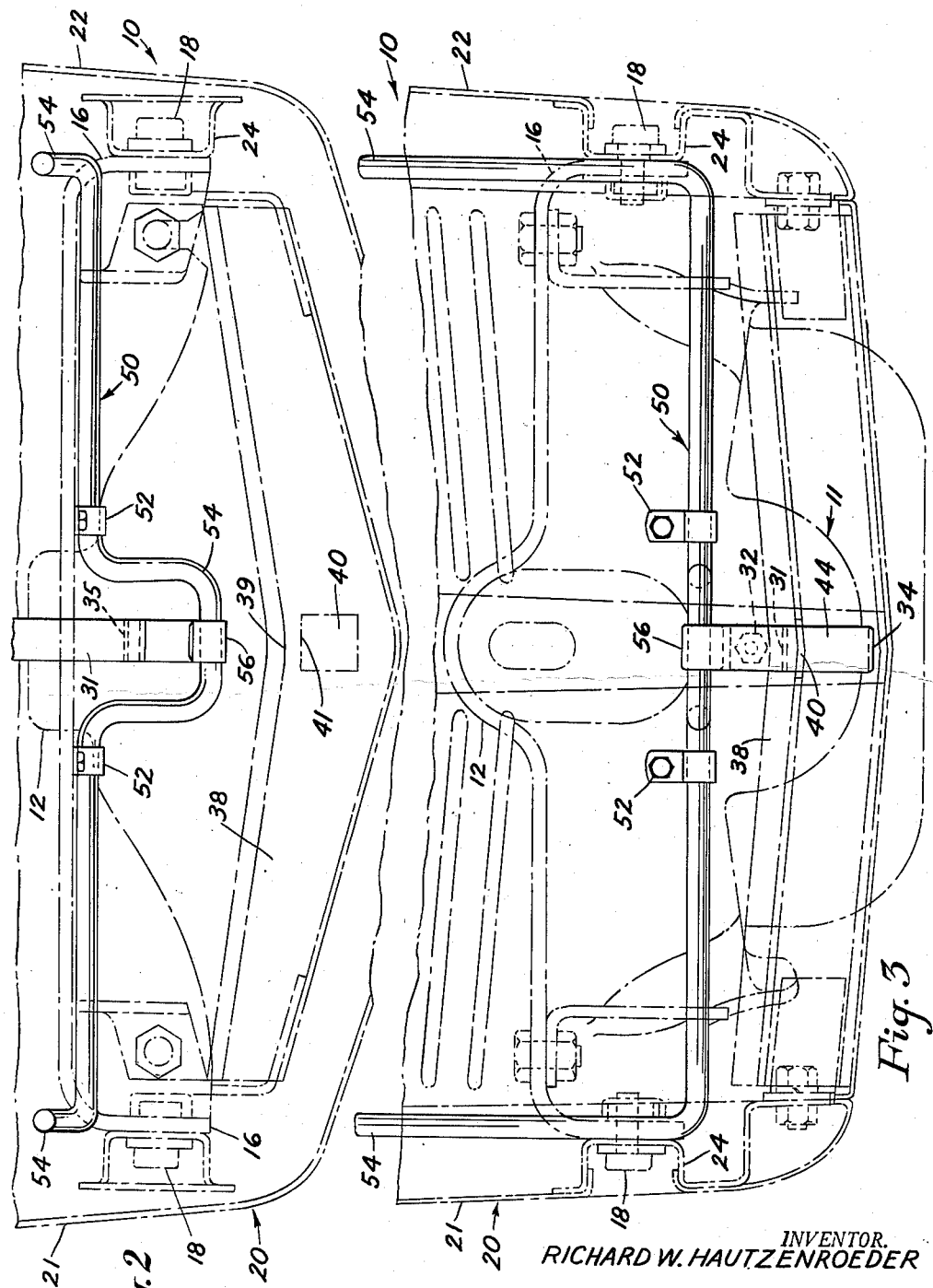
Fig. 2 is a view looking down upon the latch and showing a forward fragmentary portion of the tractor in plan view.
Fig. 3 is a front view of the latch shown in Figs. 1 and 2.

To engage the pawl 34 the hood 20 includes a reinforcing cross member 36 along the lower front edge thereof. As shown in Figs. 1 and 4 this reinforcing member is channeled in cross section and welded to the hood to form a rigid box-like structure, presenting a top surface 38 bounded along its rearwardly facing edge by a smoothly rounded corner 39. In alinement with the spring 31 there is formed in the top surface 38 a pawl-receiving aperture 40. In accordance with one aspect of the invention, the rear or pawl-engaging edge 41 of the aperture 40 is arranged at a distance A from the hood pivots 18, which distance is preferably somewhat less than the distance B from the hood pivots to the pawl 34 on the spring 31. Further in accordance with the present invention, the spring 31 has a forwardly extending guiding portion 44 which curves smoothly upward from the pawl 34. The purpose of the latter will be made clear upon considering what occurs when the hood 20 is toppled forwardly: First of all it will be noted that the corner 39 of the hood reinforcing member 36 follows such a path when the hood is raised as to strike the spring 31 at a point 46 on the forward guiding portion thereof. Upon further raising of the hood the spring 31 will be cammed upwardly into a cocked position against its inherent biasing force. The hood is increasingly tilted until the aperture 40 is moved to a point directly under the pawl 34. At such instant the pawl 34 will spring downwardly into the aperture 40 into the detented position shown in Fig. 4. This produces positive engagement between the face 35 of the pawl and the pawl engaging edge 41, preventing the hood from being lowered into its normal "at rest" position.

In order to release the pawl 34 for lowering of the hood, means are provided for pulling upwardly on the leaf spring 31. In the present instance this is accomplished by means of a crank 50 which extends from side to side on the tractor, being pivoted at pivots 52 (Figs. 2 and 3) on the hood supporting bracket 12. Such crank includes an operating handle 54 at each of its ends and a forwardly extending offset portion 54. Such offset portion is substantially U-shaped and is arranged in alinement with the spring 31. In order that upward movement of the offset portion 54 may serve to draw the spring 31 upwardly, the spring is provided at its forward end with a hook portion 56 which is so formed as to pivotally engage the crank, being prevented from disengagement by the normal biasing force of the spring. With the parts arranged as shown, it will be apparent that a rearward pull on either of the operating handles 54 will cause rocking about the pivots 52 and upward movement of the offset portion 54 and the spring 31 connected thereto. The latter serves to retract the pawl 34 from the pawl receiving aperture 40 thus permitting the hood to be rocked backwardly into its normal position.

While the latching function of the mechanism described above has been found to be particularly effective, an additional practical advantage of the structure is worthy of note. Since the spring 31 is normally biased downwardly it will be evident that it applies a downward force to the offset portion 54 on the crank 50 which is evidenced as a counterclockwise torque in Figs. 1 and 4. This tends to retain the handles 54 rocked forwardly in a clockwise direction. In such position they are completely hidden by the side walls 21, 22 of the hood. It is evident, therefore, that the latch mechanism is at all times out of sight and cannot clutter up the external appearance of the tractor. That is not to say that the latch release mechanism is not readily available to the operator. As a matter of fact it will be noted that the arms 54 lie parallel to the trailing edges of the hood sides 21, 22 and within a very short distance therefrom so that the latch may be released without searching or fumbling on the part of the operator. Since an operating handle 54 is provided at each side of the tractor convenience to the operator is greatly increased.

Additional positiveness of the detenting action may be secured if desired, merely by forming the pawl 34 so that the face 35 thereof is more hooklike and further by increasing the cross section and consequent stiffness of the leaf spring 31. Even though a strong spring is used the operating handles 54 are sufficiently long so that adequate leverage is available for instant release of the latch. It will be apparent to one skilled in the art that the amount and direction of curvature of the portion 46 of the spring will determine to a great extent the ease with which the spring 31 may be cocked into its upraised position. Thus if desired, the curvature of the portion 46 may be decreased by flattening it forwardly into a more nearly horizontal position. This increases the mechanical advantage of the hood working against the biasing force of the spring 31 and constitutes a desirable modification where extremely strong springs are employed. It will be apparent that the abruptness of the camming action may be varied through wide limits without departing from the present teachings.

It will be apparent from the drawings that biasing force on the crank 50 provided by the spring 31 prevents the crank from rattling even though there may be considerable play in the pivots 52.

What is claimed is:

1. In a tractor having a hood pivot at the forward end thereof and a hood mounted on said pivot to enable the same to be toppled forwardly for access purposes the combination comprising a pawl member on said tractor located generally under said pivot, said pawl member comprising a cantilever leaf spring having a forwardly extending resilient portion and a hook portion terminating in a pivot, a transverse reinforcing member rigidly mounted along the lower edge of said hood, said reinforcing member having an aperture therein for reception of said hook portion, and a crank rod extending transversely of said tractor, said crank rod having an operating handle and an offset portion engaged by the pivot on said pawl member for moving the latter in a releasing direction upon manual operation of said handle.

2. In a tractor having a hood pivot at the forward end of the tractor and a hood rockably mounted on said pivot for forward toppling into an upraised position for access purposes, the combination comprising a spring biased detent on said tractor located generally under said pivot, a member on said hood for engaging said detent as the hood is upraised to its limit of upward movement, and a detent releasing crank, said detent releasing crank being arranged for pivoting about an axis transversely of said tractor and having an operating handle and a horizontally offset portion, said horizontally offset portion being connected to said detent for retraction of the latter upon manual movement of said operating handle.

3. In a tractor having a hood pivot at the forward end of the tractor and a hood rockably mounted on said pivot for forward toppling into an upraised position for access purposes, the combination comprising a spring biased detent on said tractor located generally under said pivot, a member on said hood for engaging said detent as the hood is upraised to its limit of upward movement, and a detent releasing crank, said detent releasing crank being arranged for pivoting about an axis transversely of said tractor and having a horizontally offset portion connected to said detent, and a manual operating lever on each end of said crank and alternatively operable to cause retraction of the detent.

RICHARD W. HAUTZENROEDER.

REFERENCES CITED

The following references are of record in the file of this patent:

UNITED STATES PATENTS

| Number | Name | Date |
| --- | --- | --- |
| 1,740,830 | Parker | Dec. 24, 1929 |
| 1,825,595 | Kohl | Sept. 29, 1931 |